Aug. 24, 1954    G. L. DENISTON    2,687,111
STAMPING UNIT FOR INK MARKING DEVICES
Filed July 28, 1951    2 Sheets-Sheet 1
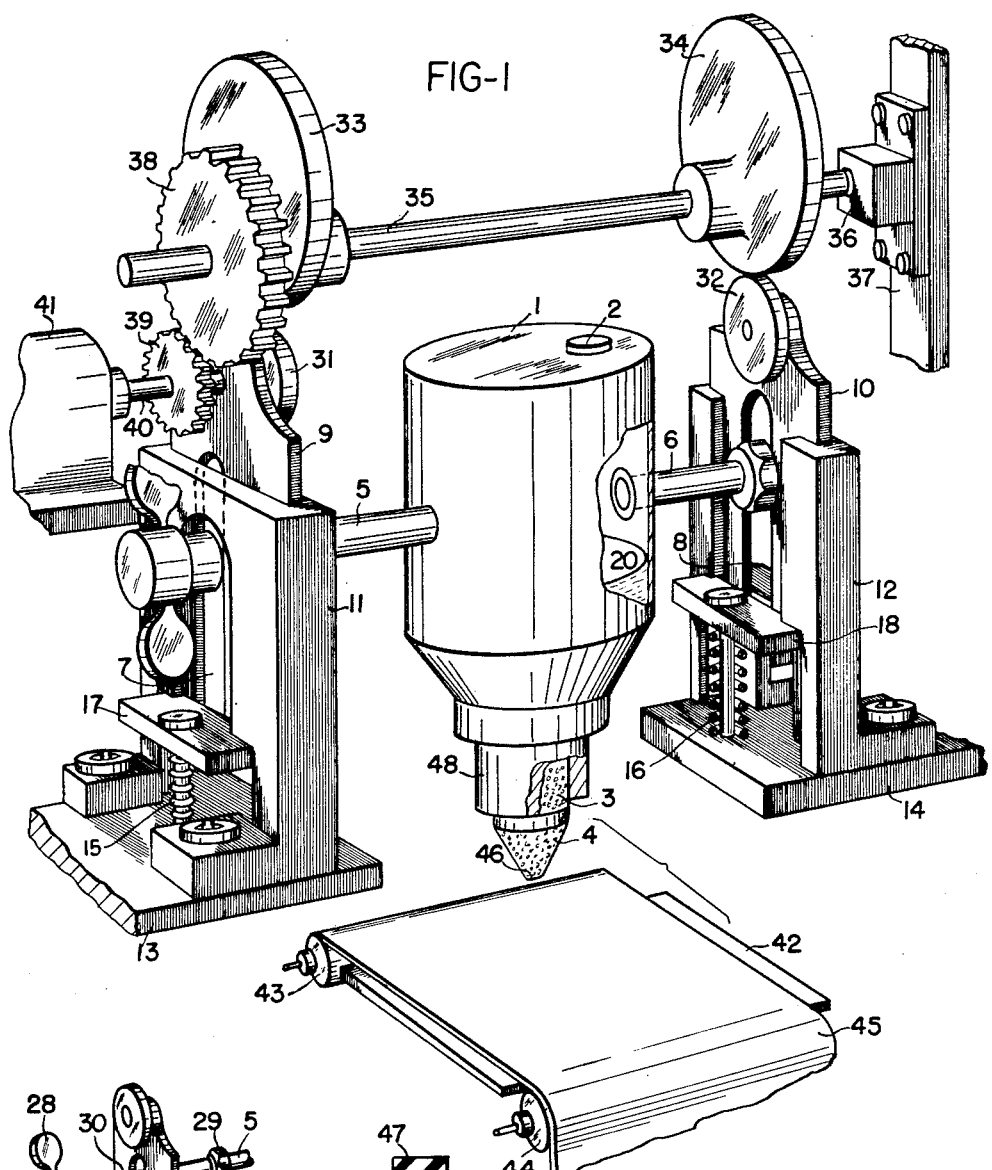
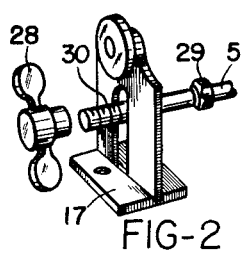
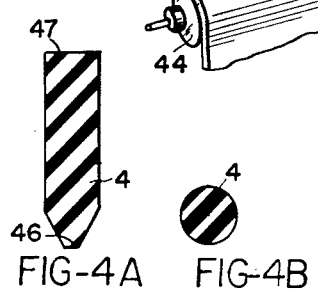
INVENTOR
GEORGE L. DENISTON
BY
ATTORNEYS Aug. 24, 1954  G. L. DENISTON  2,687,111
STAMPING UNIT FOR INK MARKING DEVICES
Filed July 28, 1951  2 Sheets-Sheet 2
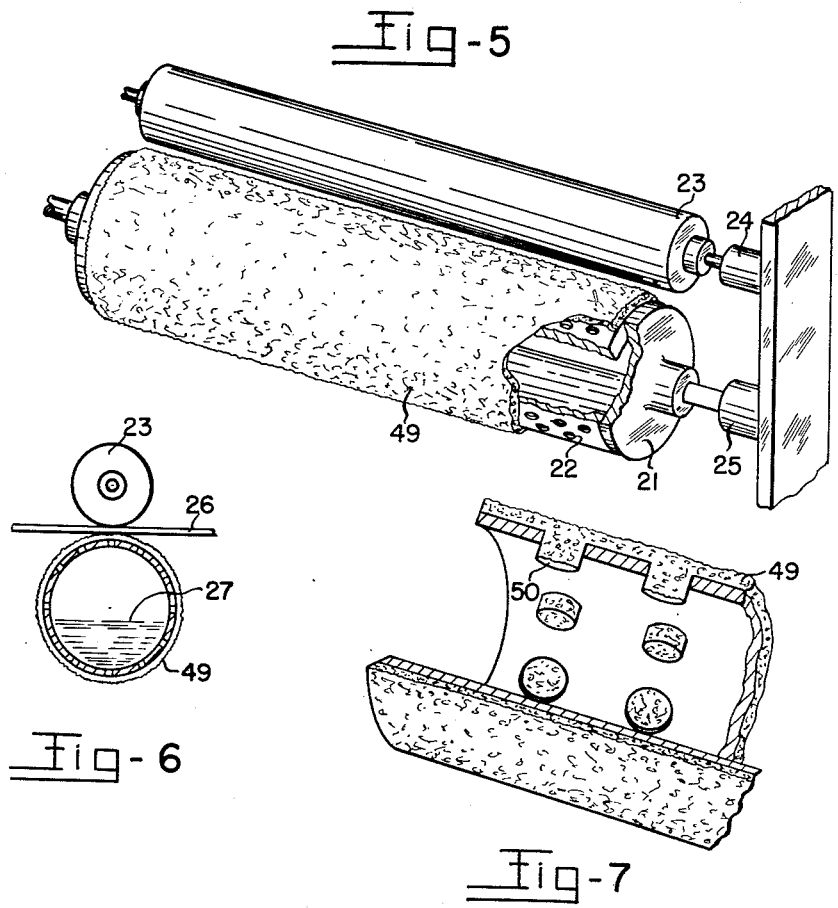
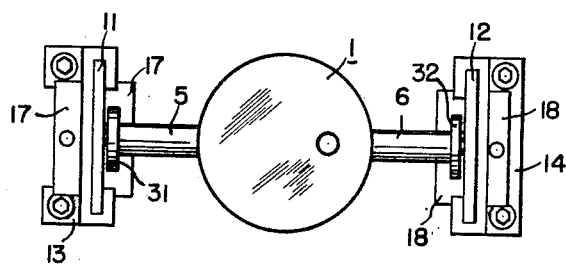
INVENTOR
GEORGE L. DENISTON
BY
ATTORNEYS Patented Aug. 24, 1954

2,687,111

UNITED STATES PATENT OFFICE 2,687,111

STAMPING UNIT FOR INK MARKING DEVICES

George L. Deniston, Dayton, Ohio, assignor to Commonwealth Engineering Company of Ohio, Dayton, Ohio, a corporation of Ohio Application July 28, 1951, Serial No. 239,127

3 Claims. (Cl. 118—256)

This invention relates to a marking device. More particularly this invention relates to apparatus including a particular form of stamping unit for the production marking of goods.

In automatic machines for the marking of goods on a production scale the stamping unit or structure which applies the ink to the goods comprises generally a pad of adsorbent, relatively inflexible material which due to the constant contact with the material being marked becomes rapidly worn.

Further, the material which is normally used in stamping units tends to retain ink and in the course of a short time the chemical action of the ink hardens and stiffens the stamping unit. This of course in turn also leads to further rapid wear of the stamping unit due to the loss of resiliency therein and frequent replacement of the stamping unit becomes necessary, leading to excessive machine shut-down time.

It is an object of this invention to provide a marking device which overcomes the above noted defects of present machines.

I have found that an excellent marking device of long life characteristics may be produced if the stamping portion of the marking device consists of a particular type of sponge rubber having small interconnecting pores through which the ink may move without leaving a residue on the side walls of the cells.

The cellular structure of this sponge rubber stamping unit is such that inks of the water and acid type will not wet the cell walls and accordingly the inking material does not adhere thereto. Further, since in the operation of the device the sponge material is compressed, ink which may be enclosed by the sponge structure will be expelled upon each compression back into the ink well which supplies the device, as well as onto the material to be marked.

My invention will be more fully understood by reference to the following description and the accompanying drawings wherein:

Figure 1 is an elevational view of the marking device of invention;

Figure 2 is a side view of a portion of the device;

Figure 3 is a plan view of the device of Figure 1;

Figures 4 (a) and (b) are illustrations of the structure of the unique sponge material;

Figure 5 is a front elevational view of a further embodiment of the invention;

Figure 6 is a side elevational view partially in section of the device shown in Figure 5; and Figure 7 is an enlarged sectional view of a modification of the structure of Figure 5.

Referring to Figure 1 there is shown at 1 a well for the reception of ink 20 through opening 2, the well being provided with a lower aperture indicated at 3 in which there is positioned in close fitting and slightly compressed relation a rubber structure 4 having interconnecting pores extending from the top to the bottom. The structure 4 as shown in Figure 1 has a portion thereof extending slightly below the well 1, and it will be understood that the lower portion 46 of rubber 4 may have any suitable configuration as required by the goods to be marked.

The well 1 is supported between shaft portions 5 and 6, the outer ends of which pass respectively through slots 7 and 8 in slide members 9, 10 movably positioned in guide posts 11, 12 secured to base members 13 and 14, the slide members being vertically supported by springs 15, 16 passing through apertures in plates 17 and 18 extending from the base of slide members 9 and 10. The shaft portions 5 and 6 are adjustably secured to slide members 9 and 10 as by wing nut 28 and nut 29 secured on threaded portions of the shafts, as more clearly seen in Figure 2.

Mounted adjacent the upper ends of slide members 9 and 10 are rollers 31 and 32 urged into contact with cams 33 and 34 by the springs 15 and 16, respectively. Cams 33 and 34 are fixedly supported on a common shaft 35 rotatably secured at one end in bearing 36 mounted on bracket 37, the shaft 35 having the other end thereof supported by bearing means (not shown) and provided with a gear 38 meshing with a gear 39 mounted on shaft 40 of motor 41.

Positioned beneath the well 1 and stamping unit 4 is a table member 42 provided on the ends thereof with rollers 43 and 44 over which passes the goods to be marked indicated generally at 45.

In operation motor 41 drives shaft 35 through gears 39, 38 which rotates cams 33, 34 causing rollers 31, 32, slides 11, 12 and well 1 to oscillate in a vertical direction. By adjustment of the height of well 1 in the slots 7, 8 of the slides 9, 10, respectively, the proper contact pressure for the rubber structure 4 with the goods 45, as determined by a few trials, may be readily provided. The goods 45 being marked may be moved automatically beneath the stamping unit 4 in any suitable manner known to the art, to provide for continuous operation of the device.

As the stamping unit 4 is exposed to the ink 20 of well 1 the ink will be taken up by the pores of the structure 4 when the device is in the position shown in Figure 1 and the ink will flow downwardly to the tip 46. Upon contact with the goods 45 in the downward movement of well 1 the structure 4 will be slightly compressed expelling ink onto the surface to be marked. Simultaneously the compression of structure 4 will expel ink from the upper end 47 of the structure 4 back into well 1, thus substantially cleansing structure 4 of ink. The transmission of the compressive stress to the upper portion of structure 4 is facilitated by the snug, slightly pressured engagement of structure 4 with wall 48 of well 1.

When the pressure is released on the rubber 4 by upward movement of the well 1, the rubber expands to its original condition and the pores again receive ink 20 from the well 1 to provide for the next marking. It will thus be noted that structure 4 acts as a small pump constantly receiving a fresh supply of ink and repeatedly discharging the same.

It is clear that the rate of oscillation of the well 1 and stamping unit 4 as well as the rate of motion of the goods 16 may be readily chosen to accommodate any desired marking interval. For example, where 200 foot length of rope is to be marked at 5 foot intervals, the well would make two oscillations per minute at a rope speed of 10 feet per minute. Suitable indexing mechanism may be readily provided for passage of the goods beneath the marking device.

In a further embodiment of the invention adapted for continuous marking of goods, there is shown in Figures 5 and 6 a hollow steel roller 21 mounted in bearings 25 and having apertures indicated at 22 and provided on the exterior surface thereof with a layer of the same sponge rubber material indicated at 49, having a thickness of about ¾ inch. Positioned in closely adjacent relationship and slightly above the roll 21 is a solid steel roller 23 suitably mounted in bearings 24. Any suitable motor drive and gear arrangement (not shown) may be employed to drive rolls 22 and 23 in synchronism, the preferred size of these rolls being about 6 inches and 3 inches, respectively.

The material to be marked 26 is passed between steel roller 23 and the material 49 as more clearly shown in Figure 6, the relationship between the rolls and the material to be marked being such that the material 49 is slightly compressed, thus marking the under surface of 26 with ink derived from the hollow roll 21, the ink generally being indicated at 27.

It will be noted that the ink in the roll 21 passes through the apertures 22 into the material 49 at the lower side of the roll as shown in Figure 5. The rotation of the roll then carries the ink bearing portions of the material 49 around to contact with the material 26, whereupon the slight compression causes the marking of the material 26 and at the same time expels some of the ink into the hollow roll 21, thus purging the pores of the material 49. As in the first embodiment the compressive stress on the material 4 may be adjusted to optimum inking conditions.

As indicated in Figure 7 the sponge material 49 may alternatively be provided with projections 50 which extend through the apertures 22 of the ink roll 21 and contact the ink 27 internally of the roll. This arrangement has the advantage that there is less opportunity for seepage between the roll 21 and the rubber 49.

It is to be understood that any suitable means may be utilized for securing member 49 to roll 21. Preferably the roll 21 is given a light coat of cement known as a tie ply and the roll 21, cement and material 49 are cured together. However, it is also feasible particularly with the roll structure shown in Figure 5 to cure the sponge material directly to roll 21 if suitable precautions, known to the roll covering art, are observed. It should be noted, however, that open air curing is preferable to curing in a complete mold, as with open air curing no continuous skin will form as frequently occurs under conditions where the rubber contacts a continuous metallic surface.

The structural formation of the material 4 or 49 may be obtained by several methods. However, I prefer that this interconnected cellular body be made by the process hereinafter set forth, but it is to be clearly understood that the structure of invention may be produced from other than the natural rubber latices, for example, neoprene, the butadienes, and the polychloroprenes are equally adaptable to the process of invention.

First there is prepared a karaya gum solution as follows:

90 grams of water
4.5 grams of ammonia hydroxide are mixed together and heated to 130° F., at about which point 2 grams of karaya gum are added to the solution while stirring. When the gum is completely dissolved, 3 cc. of ammonia hydroxide and 0.25 gram of collatone (preservative) are added to the mix, and the whole is stirred for 10 minutes at about 130° F. and then cooled to room temperature.

Secondly a master vulcanizing dispersion is made up having the following ingredients:

300 grams sulfur
300 grams zinc oxide
150 grams Permalux (a salt of dicatechol borate—an antioxidant for latex)
190 grams ethyl zimate (zinc diethyldithiocarbamate—an accelerator)
107 grams zenite (90% zinc salt of 2-mercaptobenzo thiazol plus 10% inert hydrocarbon—an accelerator
50 grams P-33 carbon black
17 grams collatone (an alkali compound of parachlorometa cresol—an accelerator)
150 grams 15% caseinate solution C Thirdly, the 15% caseinate solution C referred to above is made up by adding approximately 77 grams of water and 5 cc. of ammonia hydroxide together and heating to about 160° F., at which point 15 grams of glue are added while continuing the heating. Upon solution of the glue approximately 2.5 cc. of ammonium hydroxide and 0.25 gram of collatone are added, and the mixture is diluted with about 1400 grams of distilled water and ball milled for about 24 hours.

Approximately 3 grams of the karaya solution and 36 grams of a vulcanizing dispersion are added to 170 grams of natural creamed latex containing approximately 60 percent solids. The solution is thoroughly agitated and thereafter about 1.8 grams of a 40 percent baker's yeast solution is added, and the mixture thoroughly agitated, whereafter approximately 11 cc. of 100 volume hydrogen peroxide solution is added while continuing the agitation.

The addition of the yeast and hydrogen peroxide cause the mixture to foam and during this foaming process the rubber mixture is poured into stainless steel or aluminum molds having the size and shape of the inking tip 4. The mold is allowed to stand until the rubber has gelled, whereafter the material is cured while in the mold in steam under atmospheric conditions.

The size and number of the pores of the rubber material may be closely controlled by regulating the amount of yeast and peroxide added to the rubber mix. Normally the size of the pores will vary between about three-thousandths of an inch to about six thousandths of an inch in a given piece and rubber material having a pore size of ten to fifteen thousandths of an inch may be readily produced.

The pores are themselves interconnecting and accordingly provide a continuous passage for fluids therethrough. Further, the pores readily collapse upon the application of pressure thereto. For example, a piece of the porous material one inch in length, having a diameter of approximately ½ inch may be readily compressed to a length of ½ inch, the diameter expanding about 10 percent in the process.

In operation the liquid ink will follow a longitudinal path through the rubber material 4 and is aided in this respect by a continuous film which forms on the outer side of the rubber portion which contacts the mold. Thus substantially no liquid, even under compression conditions, will flow through the sides of the piece 4.

Since the skin referred to may form over all parts of the rubber piece which contact the mold, it may be necessary to make a cut at the section or tip 46 in order to expose the pores for passage of liquid therethrough.

It will thus be noted that the unique rubber stamping unit described will in the operation of the marking device act substantially as a small pump expelling liquid from opposing surfaces thereof when in compression and sucking liquid thereinto when the piece is allowed to expand to its original natural formation.

In the structure described the unique stamping units will have a long life and will give substantially trouble free operation.

It will be understood that this invention is susceptible to modification in order to adapt it to different usages and conditions and, accordingly it is desired to comprehend such modifications within this invention as may fall within the scope of the appended claims.

I claim:

1. In an ink marking device for the production marking of goods, a chamber defining a well for the receipt of ink therein, said chamber having an aperture, and a compressible cellular rubber member forming a closure for said aperture and having a portion thereof extending upwardly into said well and a lower ink-stamping surface portion, said ink-stamping portion comprising a tapered inking tip, said cellular rubber member extending outwardly of said chamber and having interconnected cells extending therethrough for the passage of ink from said well to said ink-stamping surface portion and which upon application of compressive stresses to said rubber member causes said cells to collapse and expel ink held therein, and skin means closing said cells which are disposed in the outermost side wall portions of said rubber member whereby ink is prevented from flowing outwardly through the side walls thereof and is restricted for passage to said ink stamping surface portion.

2. In an ink marking device for the production marking of goods, a vertically reciprocable chamber defining a well for the receipt of ink therein, said chamber having an aperture in the lower end thereof, and a compressible cellular rubber member forming a closure for said aperture and having a portion thereof extending upwardly into said well and a lower ink-stamping surface portion, said cellular rubber member having interconnected cells extending therethrough for the passage of ink from said well to said ink-stamping surface and which upon application of compressive stresses to said rubber member causes said cells to collapse and expel ink held therein, and skin means closing said cells which are disposed in the outermost side wall portions of said rubber member whereby ink is prevented from flowing outwardly through the side walls thereof and is restricted for passage to said ink-stamping surface portion.

3. In an ink marking device the combination with an ink reservoir of a compressible stamping unit consisting of a cellular rubber mass snugly engaging said reservoir at an opening therein and having opposed surfaces one of which extends into the ink of said reservoir and the other comprising an ink-stamping surface portion and which extends outwardly from the reservoir and is adapted to contact goods to be marked, the said rubber mass having outer and inner pore-surfaces interconnected by a series of open cells having a pore size in the range of about .003 inch to about .015 inch, and skin means closing said cells which are disposed in the outermost side wall portions of said cellular rubber mass whereby ink is prevented from flowing outwardly through the side walls thereof and is restricted for passage to said ink-stamping surface portion.

References Cited in the file of this patent

UNITED STATES PATENTS

| Number | Name | Date |
| --- | --- | --- |
| 1,570,857 | Perkins | Jan. 26, 1926 |
| 1,939,612 | Rose | Dec. 12, 1933 |
| 2,007,588 | Westcott | July 9, 1935 |
| 2,170,218 | Rosenberg | Aug. 22, 1939 |
| 2,315,996 | Workman | Apr. 6, 1943 |
| 2,414,895 | Reynolds et al. | Jan. 28, 1947 |
| 2,478,318 | Raub, Jr. | Aug. 9, 1949 |
| 2,562,627 | McKay | July 31, 1951 |